(12) United States Patent
Neff et al.

(10) Patent No.: US 12,435,872 B2
(45) Date of Patent: Oct. 7, 2025

(54) HIGH EFFICIENCY LOW NOX BURNER

(71) Applicant: Power Flame Incorporated, Parsons, KS (US)

(72) Inventors: David Scott Neff, Parsons, KS (US); Michael Ryan Martinie, McCune, KS (US); Michael Joseph Purdon, Independence, KS (US); Lee Edward Head, Parsons, KS (US); James Edward Clemens, McCune, KS (US); Ryan Matthew Pemberton, Parsons, KS (US); Cody J. Maloney, Independence, KS (US)

(73) Assignee: Power Flame Incorporated, Parsons, KS (US)

( * ) Notice: Subject to any disclaimer, the term of this patent is extended or adjusted under 35 U.S.C. 154(b) by 0 days.

(21) Appl. No.: 19/028,963

(22) Filed: Jan. 17, 2025

(65) Prior Publication Data

US 2025/0237380 A1     Jul. 24, 2025

Related U.S. Application Data

(60) Provisional application No. 63/622,292, filed on Jan. 18, 2024.

(51) Int. Cl.
*F23D 11/10* (2006.01)
*F23D 11/40* (2006.01)

(52) U.S. Cl.
CPC .......... *F23D 11/101* (2013.01); *F23D 11/408* (2013.01); *F23D 2900/00003* (2013.01)

(58) Field of Classification Search
None
See application file for complete search history.

(56) References Cited

U.S. PATENT DOCUMENTS

| | | |
|---|---|---|
| 3,143,159 A | 8/1964 | Smithson |
| 2005/0227195 A1 | 10/2005 | George |
| 2009/0181333 A1 | 7/2009 | Feese et al. |
| 2020/0191381 A1 | 6/2020 | George et al. |
| 2023/0033218 A1 | 2/2023 | Carroll et al. |

OTHER PUBLICATIONS

International Search Report and Written Opinion for PCT/US2025/012073, date of mailing Mar. 19, 2025, 10 pages.

*Primary Examiner* — Jason Lau
(74) *Attorney, Agent, or Firm* — Chambliss, Bahner & Stophel, P.C.; Stephen D. Adams (57) ABSTRACT

A burner having an air intake, a premix manifold, a blast tube, a rich fuel manifold, and a pilot. The blast tube includes a diffuser, an auxiliary passage, and a shutter. The shutter has at least an open position allowing air and fuel mixtures to flow through the auxiliary passage and the diffuser, and a closed position allowing flow through only the diffuser. Air moves from the air intake to the premix manifold where it mixes with a first fuel. The mixture moves through the blast tube and is ignited by the pilot, forming a lean center flame. A second fuel moves through the rich fuel manifold and ignites via the lean center flame, forming a rich secondary flame. The lean center flame and rich secondary flame combine to form a first flame.

20 Claims, 9 Drawing Sheets

FIG. 12

HIGH EFFICIENCY LOW NOX BURNER

CROSS-REFERENCE TO RELATED APPLICATIONS

This application claims the benefit of U.S. Provisional Application No. 63/622,292 filed Jan. 18, 2024, and titled "High Efficiency Low NOx Burner," which is incorporated herein by reference in its entirety.

FIELD

The present invention relates generally to adjustable blast tubes or burner assemblies utilizing adjustable blast tubes. More specifically, the invention relates to a burner assembly for creating an efficient low NOx flame with a widely adjustable output level and minimal emissions and entirely without flue gas recirculation (FGR).

BACKGROUND

Burner assemblies are often used to create steam and hot water. Additionally, burner assemblies may be used in the asphalt production process to heat a drum assembly. Conventional burners, however, suffer from one or more disadvantages. For example, conventional burner assemblies and methods produce excessive amounts of the undesirable combination of nitric oxide (NO) and nitrogen dioxide ($NO_2$) (collectively NOx) or require a large amount of excess oxygen ($O_2$), resulting in a highly inefficient burner. For example, a desired emissions output level utilizing a gaseous fuel like natural gas may be <30 ppmv NOx and <50 ppmv CO. Additionally, a low excess $O_2$ percentage is desired, such as approximately 3%. As a result, conventional burners require either expensive and complex external flue gas recirculation piping and controls, selective catalytic reduction (SCR), or burner geometry using internal flue gas recirculation systems, and/or other equipment to lower NOx emission levels and increase efficiency. As a result, conventional burner assemblies and methods have undesirably low combustion efficiencies, high maintenance requirements, and diminished operating ranges. Further, conventional burner assemblies and methods may be only suitable for a specific fuel source.

What is needed, therefore, is a blast tube for creating a low NOx flame having a wide operating range and a burner assembly and method incorporating such a blast tube. Also needed is a burner assembly capable of utilizing multiple fuel types synchronously or asynchronously, preferably with the ability to automatically to change between fuel types used, without the need for physical componentry changes while still operating under emissions constraints and output requirements.

NOTES ON CONSTRUCTION

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

"Flow direction" as used herein refers to the path or direction of air, fuel, or air/fuel mixtures moving through the blast tube and burner assembly disclosed herein. The flow direction defines the path from the inlet of the air intake to the blast zone.

"Downstream" as used herein refers to components of the blast tube or burner assembly closer in proximity or operational order to the blast zone, when following the flow direction. For example, with reference to the present invention, in certain embodiments, the blast tube is downstream of the premix manifold and the premix manifold is downstream of the air intake.

"Upstream" as used herein refers to components of the blast tube or burner assembly further in proximity or operational order from the blast zone, when following the flow direction. For example, with reference to the present invention, in certain embodiments, the air intake is upstream of the premix manifold and the premix manifold is upstream of the blast tube.

"Fluidly connected" as used herein means fluids, including liquids or gasses, can flow from one component to the other, but the two components need not be physically connected to one another. For example, intervening structures, such as piping, may be present between the two components but the two components remain fluidly connected.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

SUMMARY

The above and other needs are addressed by a blast tube having an external wall that creates a hollow interior and that also has an inlet end and a blast end. A diffuser located within the hollow interior near the blast end and provides a primary passage configured to allow fluids to pass through the diffuser. Additionally, an auxiliary passage is located radially between the diffuser and the external wall. A shutter is disposed within the hollow interior and is configured to be selectively moved between a plurality of selectable positions, including a first position and a second position. When the shutter is in the first position, the primary passage and auxiliary passage are both open such that a fluid is permitted to flow through both the primary passage and auxiliary passage. On the other hand, when the shutter is in the second position, the primary passage is open but the auxiliary passage is closed such that the fluid is permitted to flow exclusively through the primary passage.

In certain embodiments, the shutter includes a mounting plate that is located within the hollow interior of the blast tube near the blast end and that provides a central passage, a plurality of ring guides located radially about the central passage, and a plurality of blade mounts located radially about the central passage. A mounting ring is configured to rotate about an axis X relative to the central passage. The mounting ring includes a plurality of ring guide contact surfaces that are each configured to contact at least one of the ring guides. The mounting ring also includes a plurality of blade guides. Also provided is a plurality of blades that each have an inner edge that, in combination with one another, define an opening that is substantially circular in shape. Each blade also has a mounting hole and an elongate guide path. The mounting hole of each of the plurality of blades engages one of the blade mounts of the mounting plate such that each blade can be independently rotated about the mounting hole. Next, the elongate guide path of each of the plurality of blades slidably engages a separate blade guide of the plurality blade guides. As the mounting ring rotates about the axis X, rotation of the mounting ring is translated to the plurality of blades via the blade guides thereby causing the blades and each of their respective inner edge to move in unison between a plurality of rotational positions, including a first rotational position and a second rotational position and, thereby, maintaining a substantially circular opening while altering a diameter of the substantially circular opening from a first diameter to a second and different diameter. When the plurality of blades is in the second rotational position, the auxiliary passage is closed by the plurality of blades and fluid is prevented from flowing into the auxiliary passage.

In certain embodiments, the shutter includes an adjustable venturi that includes a venturi tube disposed within the interior of the blast tube and that has an entry cone opening in an upstream direction and an exit cone opening in a downstream direction. Additionally, a linear motion device attached to the venturi tube is configured to move the venturi tube upstream and downstream within interior of the blast tube between a plurality of selectable positions, including a first selectable position to a second selectable position that corresponds to the closed position. When the venturi tube is in the second selectable position, the exit cone contacts the diffuser to close the auxiliary passage to prevent fluid from flowing into the auxiliary passage.

Certain embodiments of the present invention provide a burner that includes the blast tube described above. The burner may also include an air intake having an inlet and an outlet as well as a windbox that alters a flow characteristic of air. The windbox is fluidly connected to is located disposed downstream of the air intake such that air from the outlet of the air intake flows into the windbox. Next, a premix manifold is located downstream of the windbox and is configured to mix fuel and air to form a premixed air/fuel mixture. The premix manifold has an internal cavity created by an inner wall, a first fuel channel, a plurality of fuel orifices connected to the first fuel channel and disposed radially in the inner wall that are configured to allow a first fuel to pass from the first fuel channel into the internal cavity, and a first fuel inlet configured to provide the first fuel to the fuel channel. Next, the inlet end of the blast tube is located proximate a downstream end of the premix manifold. A rich fuel manifold is located radially about the blast end. The rich fuel manifold includes a central void disposed at the blast end, a second fuel channel, a plurality of fuel nozzles fluidly connected to the second fuel channel and disposed radially about the central void on a front wall and configured to allow a second fuel to pass from the second fuel channel and through the front wall, a second fuel inlet configured to provide the second fuel to the fuel channel, and a pilot.

BRIEF DESCRIPTION OF THE DRAWINGS

Further advantages of the invention are apparent by reference to the detailed description when considered in conjunction with the figures, which are not to scale to more clearly show the details, wherein like reference numerals represent like elements throughout the several views, and wherein.

DETAILED DESCRIPTION

As detailed further below, the present disclosure describes various embodiments for a burner that is designed for sub 30 ppmv $NO_x$ (i.e., "low NOx) and sub 30 ppm CO without flue gas recirculation (FGR). However, it is contemplated that emissions can be further reduced with the addition of FGR. The burner operates with low excess air for optimal efficiency, including as low as 3% excess $O_2$. The burner fires with a turndown for emissions and a 10:1 turndown for fuel across the firing range. Changeover between liquid and gaseous fuels may be automatic, thereby requiring no addition and no removal of parts. In certain cases, an adjustable venturi moves relative to a fixed conical diffuser to obtain turndown. In other cases, an iris-type rotates to open and close an auxiliary passage for fluids to obtain turndown. A lean premix zone and rich secondary flame are used as part of the staged firing design. A liquid fuel nozzle operates using low pressure atomization with air supplied from a blower rather than an air compressor of comparable size, thereby decreasing the energy required and consumed. The burner provides various firing modes, including gas only, fuel only, and dual fuel options including a combination of gas and oil simultaneously and the use of both gas and oil individually.

Figure 1:
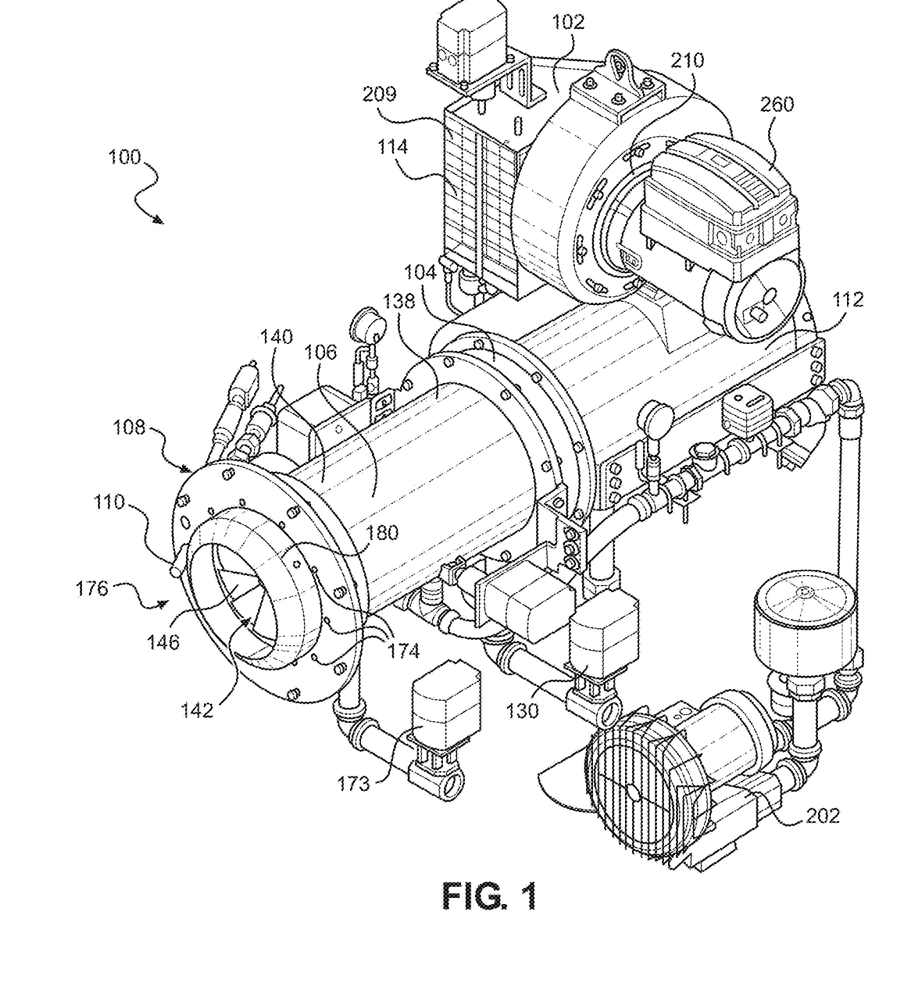
FIG. 1 is a perspective view of a burner assembly for creating a low NOx flame according to an embodiment of the present invention.
Figure 2:
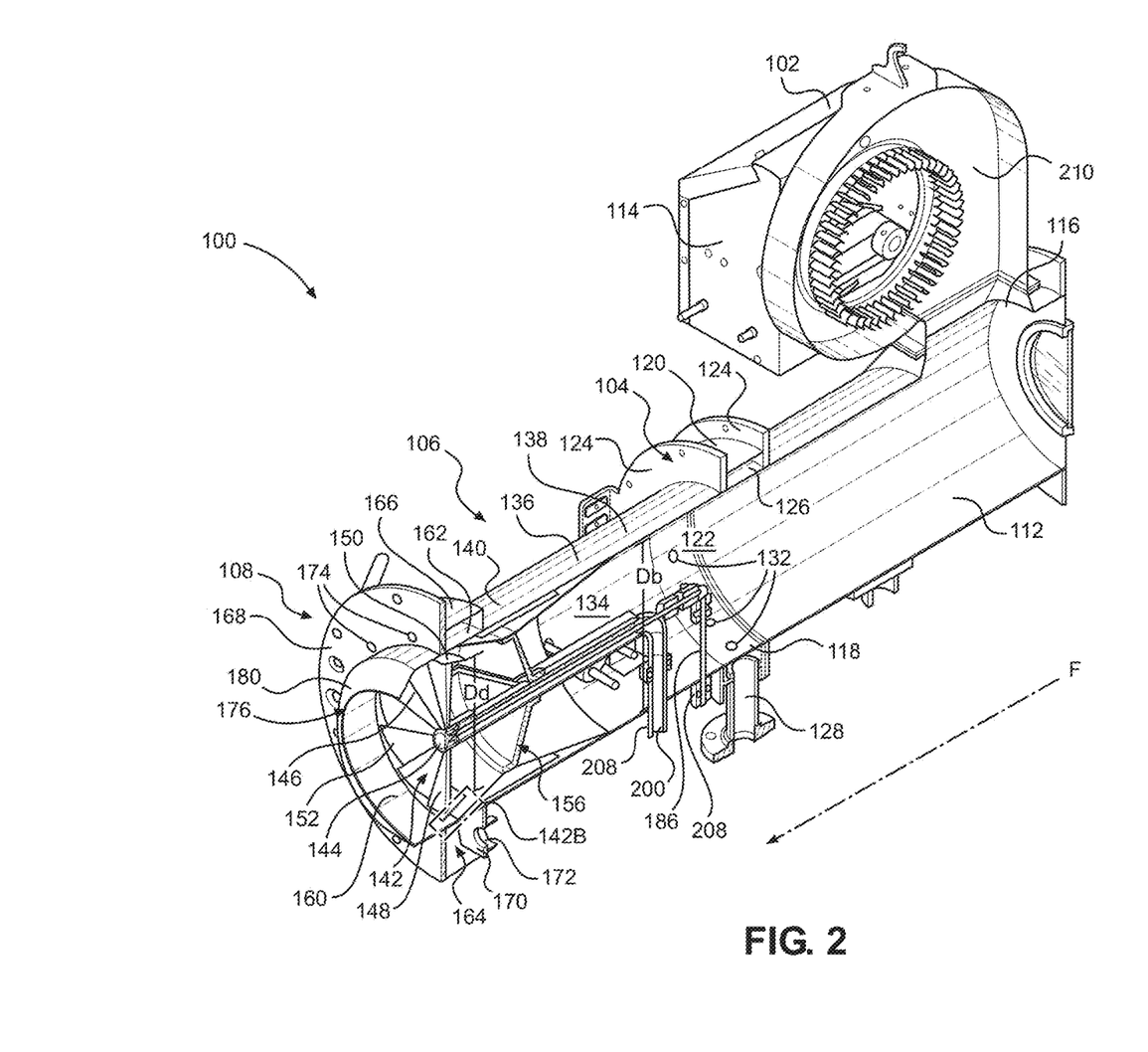
FIG. 2 is a section view of a portion of the burner assembly of FIG. 1.

Referring now to the drawings in which like reference characters designate like or corresponding characters throughout the several views, there is shown in FIG. 1 and FIG. 2 a burner assembly 100 according to certain embodiments of the present invention. The burner assembly comprises an air intake 102, a premix manifold 104, a blast tube 106, a rich fuel manifold 108, and a pilot 110. The burner assembly 100 further includes a windbox 112. The air intake 102 includes an inlet 114 and an outlet 116. The windbox 112, is located downstream of the air intake 102 and is fluidly connected to the outlet 116.

Figure 10:
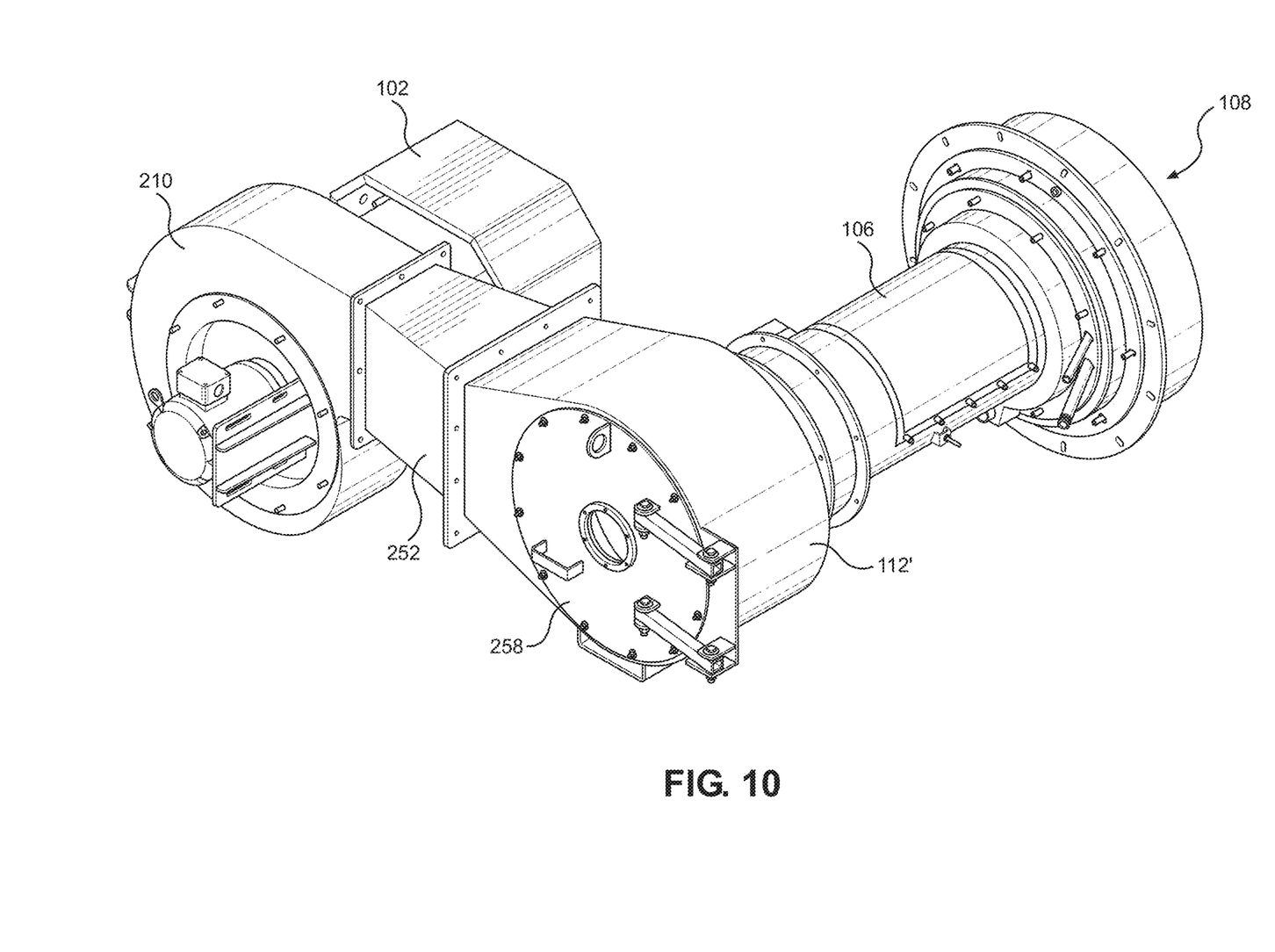
FIG. 10 is a perspective view illustrating tear-shaped windbox configured for use with the burner assembly of FIG. 1 and that is ducted to permit remote placement according to alternative embodiment of the present invention.
Figure 11:
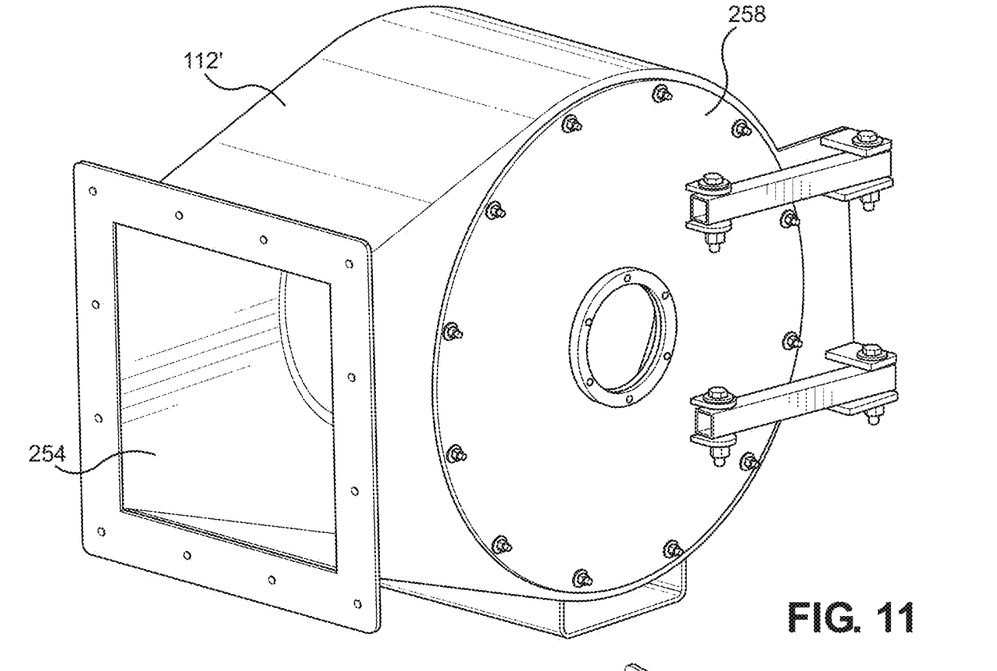
FIG. 11 is a perspective view illustrating an inlet of the windbox of FIG. 10.
Figure 12:
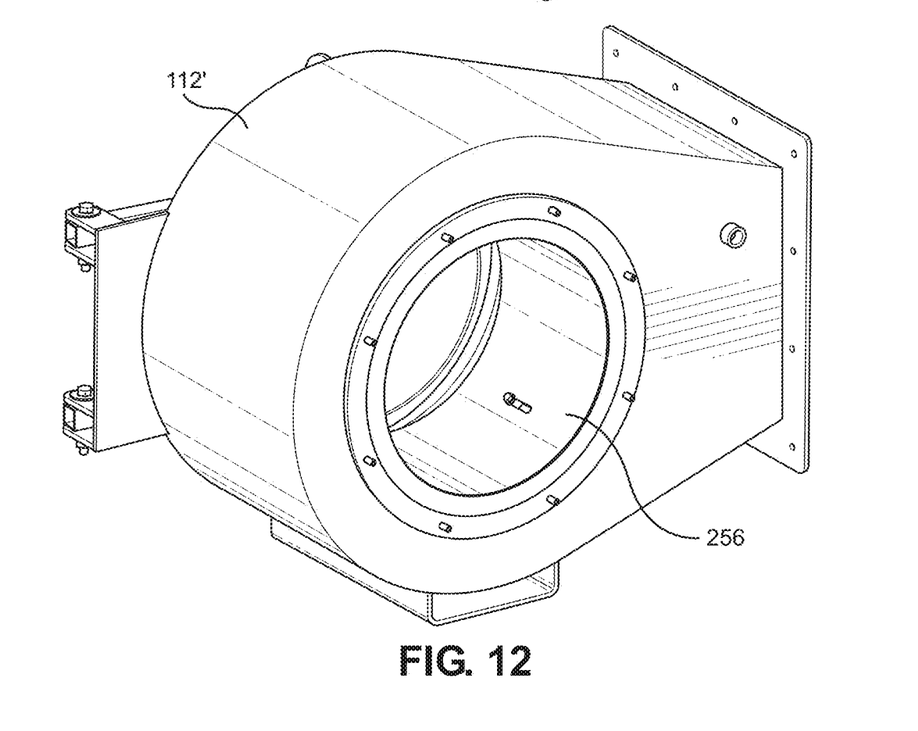
FIG. 12 is a perspective view illustrating an outlet of the windbox of FIG. 10.

In certain embodiments, the air intake 102 may be remotely positioned with relation to the rest of the burner assembly 100. For example, it may be advantageous to place an air intake where ample clean, cool, and dry air is present but the burner assembly 100 must be in an area where acceptable air is not available. In those instances, ducting, an evase, and/or other similar structures may connect the outlet 116 and the windbox 112, maintaining a fluid connection. For example, in FIGS. 10-12, a tear shaped wind box 112' that is configured to be connected via ducting 252 to a remotely located air intake 102 and blower 210 is shown. An inlet 254 of the windbox 112' that receives air from blower 210 via ducting 252 is shown in FIG. 11. An outlet 256 of the windbox 112' where air passes into blast tube 106 by way of premix manifold 104 is depicted in FIG. 12. In certain embodiments, including in the embodiment shown in FIGS. 10-12, the windbox, including illustrated windbox 112', may include an access port 258 or a selectively removable portion that provides access to an interior portion of the burner assembly 100 for servicing or maintaining the burner assembly without disassembly of the entire burner assembly or its major components.

Figure 5:
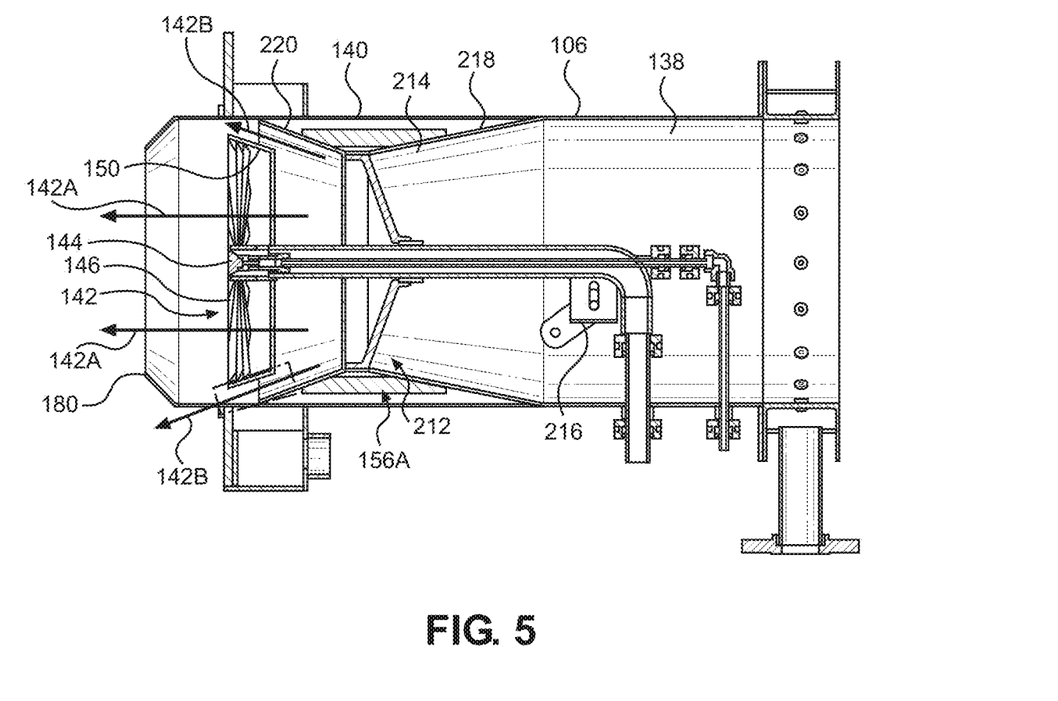
FIG. 5 is a sectional view of a blast tube having a shutter in an open position according to an embodiment of the present invention.
Figure 6:
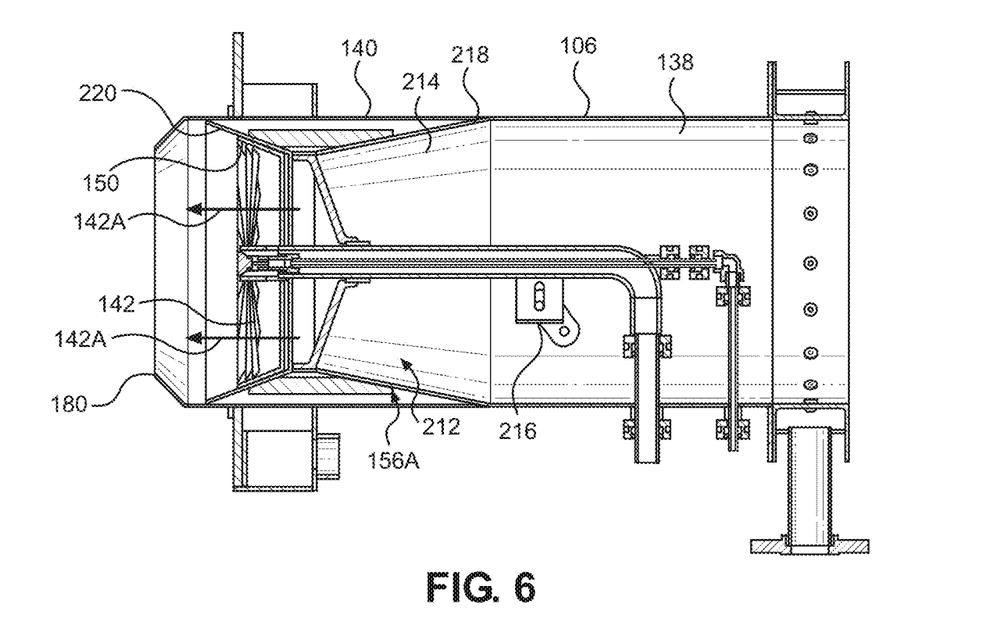
FIG. 6 is a sectional view of a blast tube having a shutter in a closed position according to an embodiment of the present invention.

Returning to FIG. 1 and FIG. 2 and with reference also to FIG. 5 and FIG. 6, adjacent the windbox 112, is the premix manifold 104. The premix manifold 104 is preferably in fluid connection with the adjacent component, whether that is the outlet 116 or the windbox 112, which may require or benefit from the use of an evase or other similar devices. Additionally, the premix manifold 104 may be provided with a removable portion, such as a door or other opening, to provide greater access and serviceability of the burner without requiring the removal of the air intake or the windbox. The premix manifold 104 comprises an inner wall 118 and an outer wall 120. Both inner and outer wall 118, 120 are depicted as circular, but may have a different shape in other embodiments. Additionally, burner assemblies 100, including components thereof such as the blast tube 106 or windbox 112, having different shapes are contemplated herein. In each case, shapes may include polygons, rounded polygons, ellipses, etc. An internal cavity 122 is confined within the inner wall 118. Attachment points, such as upright walls 124, are also disposed on the premix manifold 104 and allow adjacent components, such as windbox 112, to be selectively attached to the premix manifold. A first fuel channel 126 is located between the inner wall 118 and the outer wall 120. In the illustrated burner assembly 100 and premix manifold 104, the first fuel channel 126 is depicted as being bound by the inner wall 118, the outer wall 120 and the upright walls 124. However, in other embodiments, the first fuel channel 126 may be formed by piping, ducting, or other suitable fuel-delivery means. A fuel inlet 128 is preferably fluidly connected to the first fuel channel 126 and provides a first fuel to the fuel channel. In certain embodiments, the fuel inlet 128 includes a lean flow control valve 130 for controlling the amount of the first fuel being provided to the first fuel channel 126.

Multiple fuel orifices 132 are preferably disposed around some or all the inner wall 118 of the premix manifold 104 to fluidly connect the first fuel channel 126 to the internal cavity 122. The fuel orifices 132 are sized and configured to provide a metered amount of the first fuel into the internal cavity 122. In other words, each fuel orifice 132 provides a passage through the inner wall 118 to allow fuel to flow from the first fuel channel 126 into the internal cavity 122. In certain embodiments, the fuel orifices 132 or inserts placed within the fuel orifices for providing fluid communication (e.g., valves, etc.) are removable from the inner wall 118 to allow servicing or replacement, including to provide different numbers or sizes or orifices In certain preferred embodiments, the premix manifold 104 is selectively removable, such as by upright walls 124, thereby allowing access to the plurality of fuel orifices 132. The fuel orifices 132 may then be removed and serviced independent of the burner assembly 100.

The blast tube 106 is preferably disposed adjacent the premix manifold 104 and is in fluid communication with the premix manifold. The blast tube 106 comprises a hollow interior 134 bound by an external wall 136 and includes an inlet end 138 and a blast end 140. As discussed below, air and fuel flow in the blast tube 106 in a flow direction F from an upstream position to a downstream position. Although the blast tube 106 is shown as a cylinder, other shapes are contemplated, as described above. A diffuser 142 is disposed within the hollow interior 134 at the blast end 140. Air or a premixed air/fuel mixture can flow through the diffuser 142. As with the blast tube 106, the illustrated diffuser 142 is cylindrical but diffusers having other shapes are also contemplated herein. The diffuser 142 and the blast tube 106 are preferably the same shape but are not necessarily the same size. For example, in the illustrated embodiment, the diffuser 142 and the blast tube 106 are cylindrical but the diameter Db of the blast tube is larger than the diameter Dd of the diffuser. The ratio of diameter Dd to diameter Db may be between 0.75-0.90. The diffuser 142 is preferably coaxial with the blast tube 106. For example, when the diffuser 142 and blast tube 106 are cylindrical, as illustrated, the diffuser is concentric with the blast tube.

As described above, in certain embodiments the diffuser 142 is cylindrical in shape. In this instance, the diffuser 142 may have a central node 144 surrounded by a plurality of diffuser blades 146 disposed radially about the central node. Each diffuser blade 146 includes a first end 148 attached to the central node 144. The blades 146 are disposed at a slight angle with at least a portion of each blade overlapping at least one adjacent blade when viewed axially along flow direction F. As air passes through the diffuser 142, the air is forced through gaps formed between the blades, which causes the air exiting the diffuser to swirl. Thus, the diffuser provides a central passage 142A around the central node 144 and through the diffuser blades 146. This arrangement also prevents or reduces unwanted reverse airflow through the diffuser 142. In certain embodiments, the blades 146 are movable (e.g., via manual adjustment or via dedicated actuator/servo) with respect to the central node 144 which allows for fine-tuning of the gaps and the swirl characteristics of the air or air/fuel mixture passing through the diffuser 142. The diffuser 142 also includes an outer band 150 that is concentric with the central node 144. The outer band 150 may be cylindrical in shape or may be cone-shaped where the cone opens (i.e., has a larger outer diameter) downstream and has a smaller outer diameter upstream. In certain embodiments, the outer band 150 is fixed in place relative to the blast tube 106. In certain embodiments, the outer band 150 is affixed to a second end 152 of the diffuser blades 146 located opposite the first end 148. In certain embodiments, additional vanes are included to support the outer band 150.

An auxiliary passage 142B is located between the diffuser 142 and the blast tube 106. Also disposed within the interior 134 is a shutter 156 having an open position and a closed position. In the open position, air or the premixed air/fuel mixture can flow through both the diffuser 142 and the auxiliary passage 142B. However, when the shutter 156 is in the closed position, the auxiliary passage 142B is blocked and air or the premixed air/fuel mixture is only permitted to flow through the diffuser 142. In certain embodiments, the shutter 156 also has multiple, including potentially infinite, positions between the open and closed positions to allow for fine-tuning of the amount of flow through the auxiliary passage 142B.

The rich fuel manifold 108 of the burner assembly 100 is disposed radially about the blast end 140. The rich fuel manifold 108 preferably includes a central void 160 that extends through the rich fuel manifold. The central void 160 is generally coincident and congruent with the hollow interior 134 at the blast end 140. For example, in the illustrated embodiment, the central void 160 extends the cylindrical hollow interior 134 into and through the rich fuel manifold 108. The central void 160 is preferably bound by an inner radial wall 162. A second fuel channel 164 encircles the central void 160 and is bound by the inner radial wall 162, an outer radial wall 166, a front wall 168, and a rear wall 170. Alternatively, the second fuel channel 164 may be formed by external piping, ducting, or other appropriate fuel-delivery means. A second fuel inlet 172 is fluidly connected to the second fuel channel 164 and provides a second fuel to the second fuel channel. The second fuel inlet 172 may be regulated by a flow control valve 173. A plurality of fuel nozzles 174 are disposed radially about the central void 160, preferably on the front wall 168, if present. Each individual fuel nozzle 174 is connected to the second fuel channel 164 and provides a path for the second fuel to pass out of the second fuel channel and through the front wall 168. The fuel nozzles 174 are oriented to direct the second fuel exiting the fuel nozzles into an area located adjacent and downstream from the blast end 140, i.e., a blast zone 176. The pilot 110 is also disposed near the blast zone 176. In certain embodiments, a flame shaping device 180, such as a choke, may be provided at the blast end 140.

Figure 3:
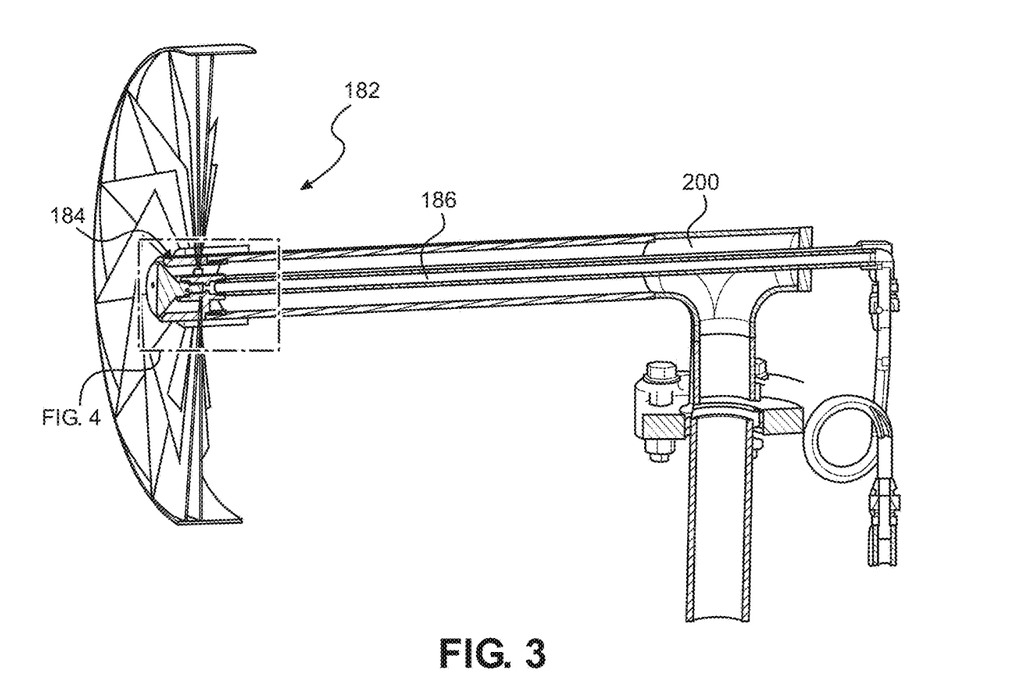
FIG. 3 is a sectional view of a portion of a liquid fuel nozzle disposed inside a blast tube according to an embodiment of the present invention.
Figure 4:
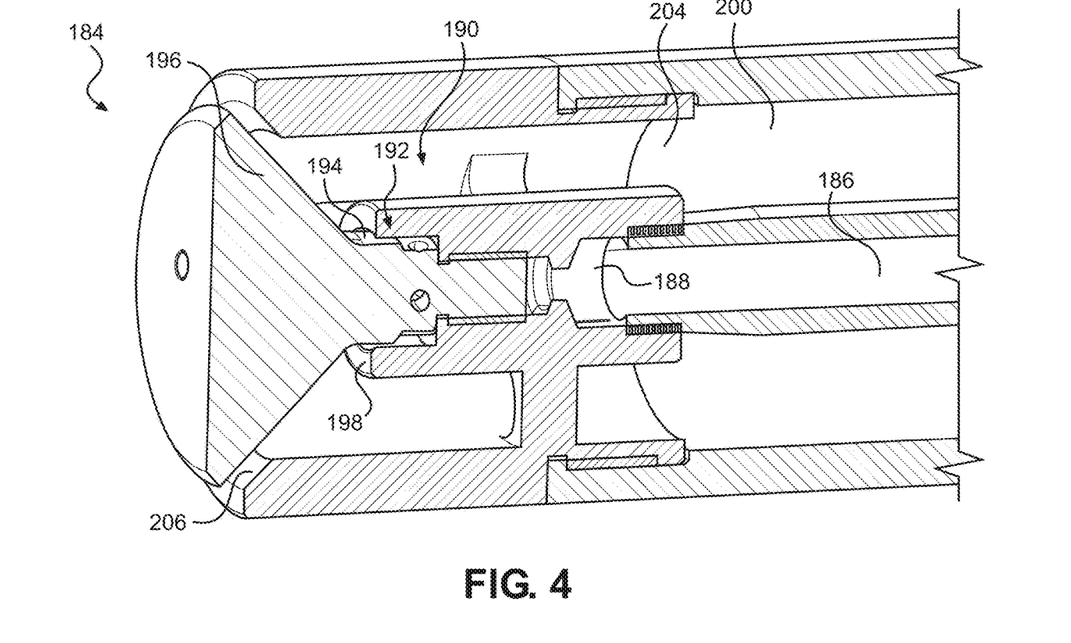
FIG. 4 is a detailed view illustrating a fuel nozzle head depicted in FIG. 3 and enclosed in a box labeled "FIG. 4"

With continued reference to FIGS. 1 and 2 and with further reference to FIG. 3 and FIG. 4, in certain embodiments, the burner assembly 100 includes a liquid fuel nozzle 182 disposed within the blast tube 106 and configured to deliver an atomized air/fuel mixture to the blast end 140. The liquid fuel nozzle 182 comprises a fuel nozzle head 184 and a liquid fuel passage 186. Liquid fuel passage 186 provides a liquid fuel to a liquid fuel nozzle inlet manifold 188 disposed within the fuel nozzle head 184. The fuel nozzle head 184 also includes an atomizing chamber 190 and a liquid fuel diffuser 192. The liquid fuel diffuser 192 is preferably located in the atomizing chamber 190 and is attached to the liquid fuel nozzle inlet manifold 188. The liquid fuel diffuser 192 includes at least one liquid fuel orifice 194 bound internally by a diffusion cone 196 and externally by an outer annulus 198. The diffusion cone 196 is preferably a paraboloid or partial hyperboloid shape when viewed normal to the flow direction F (e.g., in the perspective generally shown in FIG. 4), but other suitable shapes are also considered, e.g., conical, tetrahedral, pyramidal, etc. The diffusion cone 196 preferably has a surface finish of at least 32 RMS (i.e., the root mean square average of the profile height deviations from the mean line, recorded within the evaluation length) on at least the portion exposed to the atomizing chamber 190. However, in more preferred embodiments, the diffusion cone 196 has a surface roughness of 64 RMS or greater. As the liquid fuel exits the liquid fuel orifice 194 by passing between the diffusion cone 196 and the outer annulus 198, the surface tension and a capillary action between the liquid fuel and the diffusion cone 196 creates a thin film of liquid fuel distributed over the diffusion cone on at least the portion exposed to the atomizing chamber 190.

The liquid fuel nozzle 182 also includes an atomizing air passage 200. An atomizing air blower 202 (FIG. 1) may be configured to provide atomizing air to the atomizing air passage 200. The atomizing air passage 200 is in fluid connection with an atomizing air inlet 204, preferably disposed within the nozzle head 184. The atomizing air inlet 204 provides a passage for the atomizing air in the atomizing air passage 200 to enter the atomizing chamber 190. After entering the atomizing chamber 190 and moving towards and then out of an atomized air/fuel outlet 206, the atomizing air shears at least a portion of the thin film of liquid fuel exposed within the atomizing chamber as it exits the diffusion cone 196. The shearing action creates droplets of liquid fuel suspended in the atomizing air. In certain embodiments, the atomizing air is turbulent within the atomizing chamber 190. However, in other cases, the atomizing air may flow in a laminar state. The liquid fuel and atomizing air emulsify within the atomizing chamber 190, creating an atomized air/fuel mixture. The atomized air/fuel mixture then exits the atomizing chamber 190 through the atomized air/fuel outlet 206. The liquid fuel nozzle 182, as described, can create the atomized air/fuel mixture utilizing atomizing air at pressures as low as 0-5 PSIG (Pounds per Square Inch Gauge).

In certain embodiments, the atomizing air passage 200 and the liquid fuel passage 186 pass into the blast tube 106 at the inlet end 138 and then extend towards the blast end 140. For example, atomizing air passage 200 and liquid fuel passage 186 may comprise tubing that passes through the external wall 136, preferably with both being secured to the external wall with a fitting 208 (FIG. 2). The atomizing air passage 200 and the liquid fuel passage 186 then extend towards the blast end 140. The atomizing air passage 200 and liquid fuel passage 186 may be two independent passages. Alternatively, the atomizing air passage 200 and liquid fuel passage 186 may be partially or fully annular within the blast tube 106. In certain embodiments, the fuel nozzle head 184 is disposed within or creates the central node 144 of the diffuser 142 and is configured to discharge the atomized air/fuel mixture into the blast zone 176. In other embodiments, for example, in burner assemblies 100 capable of outputs higher than 150 MMBtu, a plurality of fuel nozzle heads is preferably provided about the center axis of the diffuser. For example, these nozzle heads may be provided and arranged radially about the central node 144.

In operation, the burner assembly 100 utilizes a staged combustion to produce a lean center flame, a rich secondary flame, and a fuel oil flame. Each flame can be adjusted to produce desirable emissions levels. Initially, the first fuel is provided to the first fuel channel 126 and enters the internal cavity 122 of the premix manifold 104 through the plurality of fuel orifices 132. Preferably, the first fuel is natural gas; however, other gaseous (i.e., vapor) fuels may also be utilized in certain embodiments. Air then enters the burner assembly 100 through the air intake 102. In certain embodiments, the air intake 102 includes a damper having a plurality of adjustable damper blades 209 (FIG. 1) that are disposed at the inlet 114. The damper is used to regulate airflow. Each damper blade 209 is movable to various positions between an open position and a closed position. A blower 210 (FIG. 1) is provided between the inlet 114 and the outlet 116. The blower 210 causes air to flow in through the inlet 114 of the air intake 102 and then out through the outlet 116 thereof. The blower 210 is driven by a motor 260 that may be operated at a constant speed or that may include a remote or integral variable frequency drive, allowing for operation at different speeds. The blower 210 may also work in concert with the adjustable dampers 209 to finely tune the amount of airflow in order to modify flame characteristics. Air flowing out of the outlet 116 of the air intake 102 then enters the windbox 112. The windbox 112 may simply direct the air without making any change to it or the windbox may alter a flow condition of the air. For example, the air may change from a straight flow path to a swirled flow path, from a laminar state to a turbulent state, or both. Additional flow condition alterations are also contemplated herein. The air, whether from the outlet 116 or the windbox 112 then enters the premix manifold 104. As discussed above, the windbox 112 may also allow the air intake 102 to be remotely positioned and remain in fluid connection with the remaining burner assembly 100. In particular, the air intake 102 may be remotely positioned with relation to the rest of the burner assembly 100. In those instances, ducting or an evase may connect the outlet 116 and the windbox 112, maintaining a fluid connection. This arrangement is shown, for example, in FIGS. 10-12, where tear shaped wind box 112' is connected via ducting 252 to a remotely located air intake 102 and blower 210.

As the air enters the premix manifold 104, and particularly the internal cavity 122, it mixes with the first fuel therein and creates a premixed air/fuel mixture. The premixed air/fuel mixture then moves into the blast tube 106 at the inlet end 138 and flows downstream towards the blast end 140. In certain embodiments, the shutter 156 is initially in a closed position, meaning air or the premixed air/fuel mixture can flow through only the diffuser 142. As the air or premixed air/fuel mixture passes through the diffuser, it is preferably swirled. The premixed air/fuel mixture then passes the pilot 110 and is ignited in the blast zone 176 to create the lean center flame. The lean center flame is typically characterized by a high air to fuel ratio, meaning excess $O_2$ may be present. In certain embodiments, liquid fuel may also be provided to the lean center flame via liquid fuel nozzle 182. However, in other embodiments, the liquid fuel nozzle 182 may be the sole fuel source.

At the same time or after the creation of the lean center flame, a second fuel is provided to the second fuel channel 164 via the second fuel inlet 172. Preferably, the second fuel enters the second fuel channel 164 at a metered, controllable rate, for example, as controlled by flow control valve 173. As with the first fuel, the second fuel is preferably natural gas, but other gaseous fuels may be suitable. The second fuel then exits the second fuel channel 164 via the fuel nozzles 174, where it mixes with the excess $O_2$ and combustion products from the lean center flame. This mixture is ignited by either the pilot 110 or the lean center flame, creating a rich secondary flame. In contrast to the lean center flame, the rich secondary flame is typically characterized by a low air to fuel ratio. The lean center flame and the rich secondary flame, when combined, preferably produce a low NOx flame.

During startup and while the lean center flame and the secondary rich flame are burning, each flame may have varying fuel requirements and may produce varying amounts and types of emissions. For example, to ignite and stabilize the flames, varying amounts of the first or second fuel may be required, which may result in the production of ample, undesirable emissions, such as NOx, CO, or $O_2$. However, after the flames are established, the fuel requirements and resulting emissions may differ. To alter the flame characteristics or emissions outputs, the amount of the first or second fuel provided to the respective fuel channels 126, 164 may be adjusted, the type of fuel may be altered, the amount of air passing through the intake 102 may be adjusted, and/or the position of the shutter 156 may be changed. Preferably, to produce the desired low NOx flame, the first and second fuels are provided in a range from 60% first fuel/40% second fuel to 90% first fuel/10% second fuel, or any amount between. More preferably, the fuel amount ranges from 70% first fuel/30% second fuel to 80% first fuel/20% second fuel, or any amount between. In certain embodiments, a flame utilizing only liquid fuel may be desirable, in which case fuel would be provided only by the liquid fuel nozzle 182.

Providing this adjustability allows the burner assembly 100 to be more widely utilized. For instance, an application for the disclosed burner assembly 100 may require a wide temperature firing range (i.e., turndown ratio). In preferred embodiments, adjusting the various parameters of the burner assembly 100, as described above, allow the burner assembly to function with a fuel turndown ratio of 10:1, meaning the burner assembly is capable of operating with a firing rate that is 10× its minimum firing rate. As an example, if the minimum firing rate of a burner according to the present design is 300,000 BTU/hr., the burner preferably has a maximum firing rate of 3,000,000 BTU/hr. Similarly, the burner can meet emissions requirements at a turndown ratio of 6:1 relative to the maximum firing rate. As further discussed below, shutter 156 assists in providing this adjustability.

With reference to FIG. 5 and FIG. 6, a shutter 156A according to an embodiment of the present invention is shown in an open position and in a closed position, respectively. The shutter 156A is moved between open position, the closed position, or any intermediate position to provide a desired turndown or to assist in providing a desired turndown when combined with modifying various other operating parameter. In the depicted embodiment, the shutter 156A comprises an adjustable venturi 212 having a venturi tube 214 and a linear motion device 216. In the illustrated embodiment, the diffuser 142 is conical in shape and includes a conical outer band 150. Preferably the diffuser 142 is concentric with the blast tube 106 and opens downstream. Alternatively, diffuser 142 may be circular. The venturi tube 214 is preferably disposed concentrically with and positioned within the blast tube 106. The venturi tube 214 includes an entry cone 218 and an exit cone 220. The entry cone 218 opens towards the inlet end 138, meaning the widest portion of the entry cone is closest to the inlet end and the exit cone 220 opens towards the blast zone 176 meaning the widest portion of the exit cone is closest to the blast zone. The linear motion device 216 is attached to or contacts the venturi tube 214 and can move the venturi tube axially (i.e., upstream and downstream) within the blast tube 106 between a first position (FIG. 5) and a second position (FIG. 6). Additional intermediate positions, including infinite intermediate positions, between the first and second positions may be possible in certain embodiments to provide for further (i.e., fine) adjustment. The linear motion device 216 may be a linkage, a cylinder, a power screw, gears, or other similar device alone or in combination with the given examples. In the first position, the venturi tube 214 does not contact the diffuser 142 and the auxiliary passage 142B is open, meaning air or the premixed air/fuel mixture can pass freely through the auxiliary passage. Conversely, in the second position, the venturi tube 214 contacts outer band 150 of the diffuser 142 and prevents flow through the auxiliary passage 142B. In certain embodiments, like the illustrated embodiment, the outer band 150 has a slight conical shape that is complementary to and coaxial with the shape of the exit cone 220. In such cases, as the venturi tube 214 contacts the outer band 150 in the second position, the outer band contacts and nests within the exit cone 220 further ensuring no air or premixed air/fuel mixture enters the auxiliary passage 142B.

Figure 7:
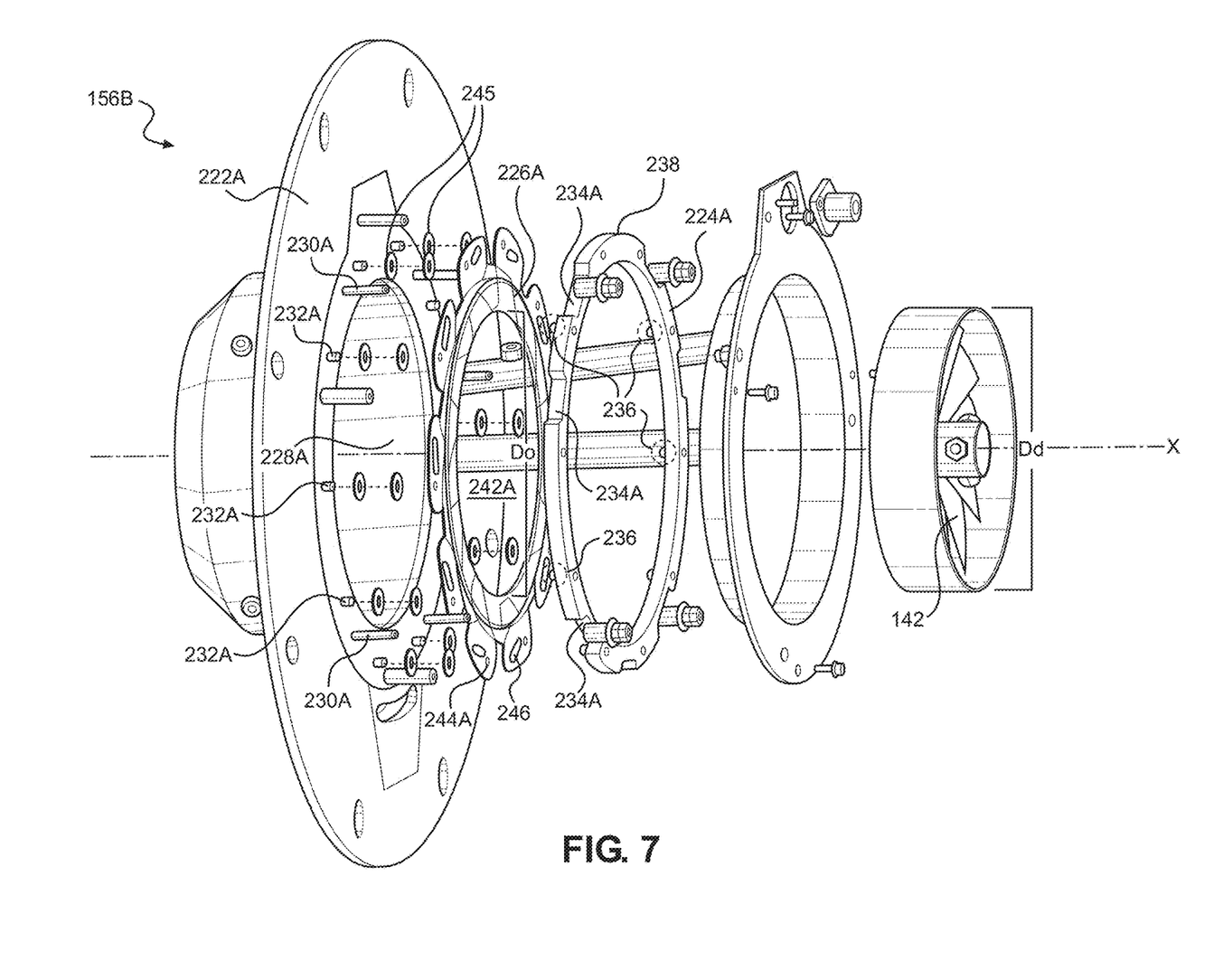
FIG. 7 is an exploded perspective view of a shutter according to an alternative embodiment of the present invention.

Turning now to FIG. 7, a shutter 156B according to an alternative embodiment is shown. In the illustrated embodiment, the shutter 156B comprises a mounting plate 222A, a mounting ring 224A, and a plurality of blades 226A. The mounting plate 222A is preferably located at the blast end 140 (FIG. 2) and forms a portion of the external wall 136 about the diffuser 142. The mounting plate 222A includes a central passage 228A which functionally extends the hollow interior 134 through the mounting plate 222A. In certain embodiments, the mounting plate 222A may be integrated into the rich fuel manifold 108. The mounting plate 222A further includes a plurality of ring guides 230A and a plurality of blade mounts 232A that, as described further below, are used to connect the mounting plate together with the plurality of blades 226A. The blade mounts 232A are preferably disposed radially about the central passage 228A of the mounting plate 222A and extend in an upstream direction. The ring guides 230A may, in certain embodiments, comprise shoulder bolts, pins, or other suitable hardware. Similarly, the blade mounts 232A may be pins, screws, or other suitable fasteners or securing devices. The outer peripheral surface of the mounting ring 224A preferably includes a plurality of radially spaced ring guide contact surfaces 234A that, in the illustrated embodiment, are formed as channels or notches in the mounting ring. When assembled, the ring guide contact surfaces 234A contact the ring guides 230A. Preferably, in use, contact between the ring guides 230A and the opposing ends of the ring guide contact surface 234A limit rotation of the mounting ring 224A with respect to the mounting plate 222A.

The mounting ring 224A further includes a plurality of blade guides 236. As shown, the blade guides 236 comprise pins embedded in the mounting ring 224A and extending in a downstream direction. However, the blade guides 236 may be other suitable fasteners (e.g., rivets, screws, magnets, etc.) that are sufficient to engage with and to limit rotation of the corresponding blade. As will be further discussed below, each of the blade guides 236 interact with an elongate guide path 246 formed in each of the plurality of blades 226A to move and to limit movement of the blades.

The mounting ring 224A is also configured to rotate about the central passage 228A. For example, if the blast tube 106 and central passage 228A are cylindrical and coaxial, the mounting ring 224A rotates about a shared axis X. The mounting ring 224A may also include a rotation means, such as gear teeth 238, that mesh with a corresponding motor and gear (not shown) for rotating the mounting ring 224A about axis X.

The plurality of blades 226A are preferably arranged such that their inner edges, in combination with one another, define a substantially circular opening 242A. Here, "substantially circular" refers to a shape that is generally circular but that may be defined by straight or slightly curved edges arranged radially about a central point. For example, a cyclic polygon defined by n straight edges (i.e., inner edges) is considered substantially circular here. While n is at least 2, in more preferred embodiments, n is at least 8. in certain cases, including the illustrated embodiment, the blades 226A include a slightly curved inner edge to create the substantially circular opening 242A. Each blade 226A includes a mounting hole 244A and an elongate guide path 246.

When the shutter 156B is assembled, the blades 226A are disposed between the mounting plate 222A and the mounting ring 224A. The blades 226A are rotatably joined to the mounting plate 222A by inserting a blade mount 232A of the mounting plate through mounting holes 244A of the blades such that the blades are permitted to rotate about the blade mounts. Next, rotational travel and the rotational position of the blades 226A is controlled by inserting blade guides 236 of the mounting ring 224A into the elongate guide paths 246 of the blades. Washers 245 may slide over blade mounts 232A to provide an offset from the mounting plate 222A. This enhances engagement of the blades 226A with the blade mounts 232A and the blade guides 236. Blade guides 236 may also have a shoulder (not shown) on their downstream end requiring the blade guide 236 to pass through the elongate guide path 246 prior to being fastened to mounting ring 224A. This acts to prevent the blade 226A from slipping off the blade guide 236.

In operation, the mounting ring 224A rotates relative to the central passage 228A about axis X and this rotational motion is translated to the blades 226A to cause the blade to rotate in unison like an iris, producing a size-variable opening 242A. In particular, as the mounting ring 224A rotates about axis X, each blade guide 236 travels along one of the elongate guide paths 246. Each of the blades 226A rotate or pivot about the mounting hole 244A while the blade guides 236 travel along the guide path 246 to control the rotational travel and the rotational position of the blades. This motion causes the blades to rotate inwards or outward in unison with one another, depending on the direction that the rotational travel and the rotational position of the blades 226A. Throughout this motion, the substantially circular opening 242A is maintained while the diameter Do of the substantially circular opening changes from a first diameter to a second diameter. Preferably, the second diameter is the same as the diameter Dd of the diffuser 142 and the blades 226A are at least partially coincident with the diffuser. As a result, at the second diameter, the blades 226A close the auxiliary passage 142B, i.e., the second diameter corresponds to the closed position of the shutter 156B. Although the shutter 156B described here corresponds to a cylindrical blast tube 106 and diffuser 142, the shutter may be adapted to blast tubes and diffusers having other shapes.

Figure 8A:
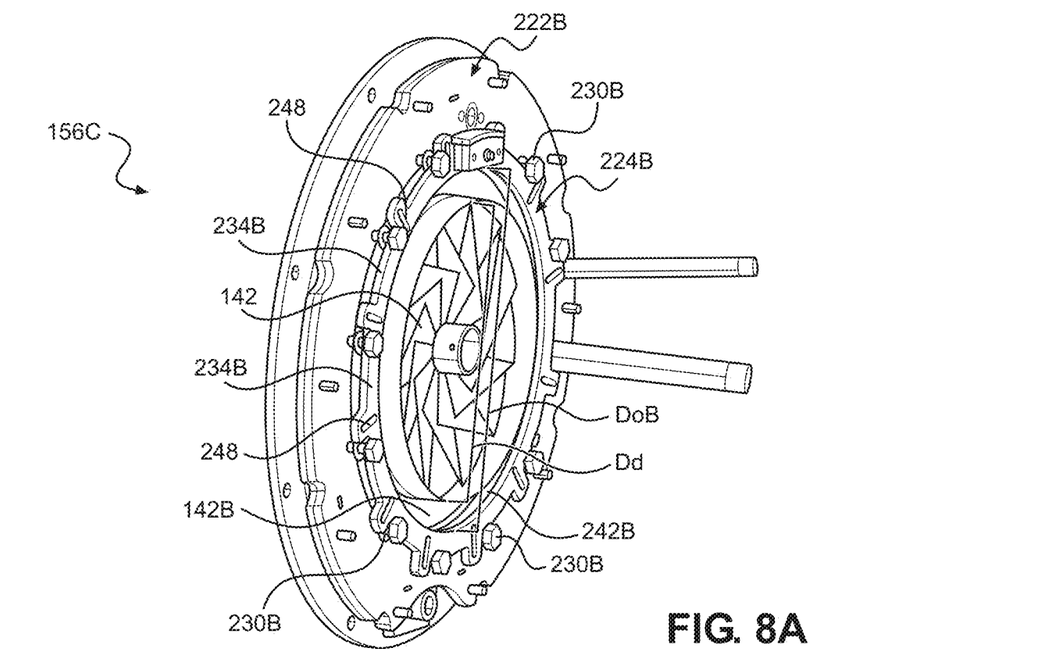
FIG. 8A is a perspective view of a shutter according to an alternative embodiment of the present invention.
Figure 9:
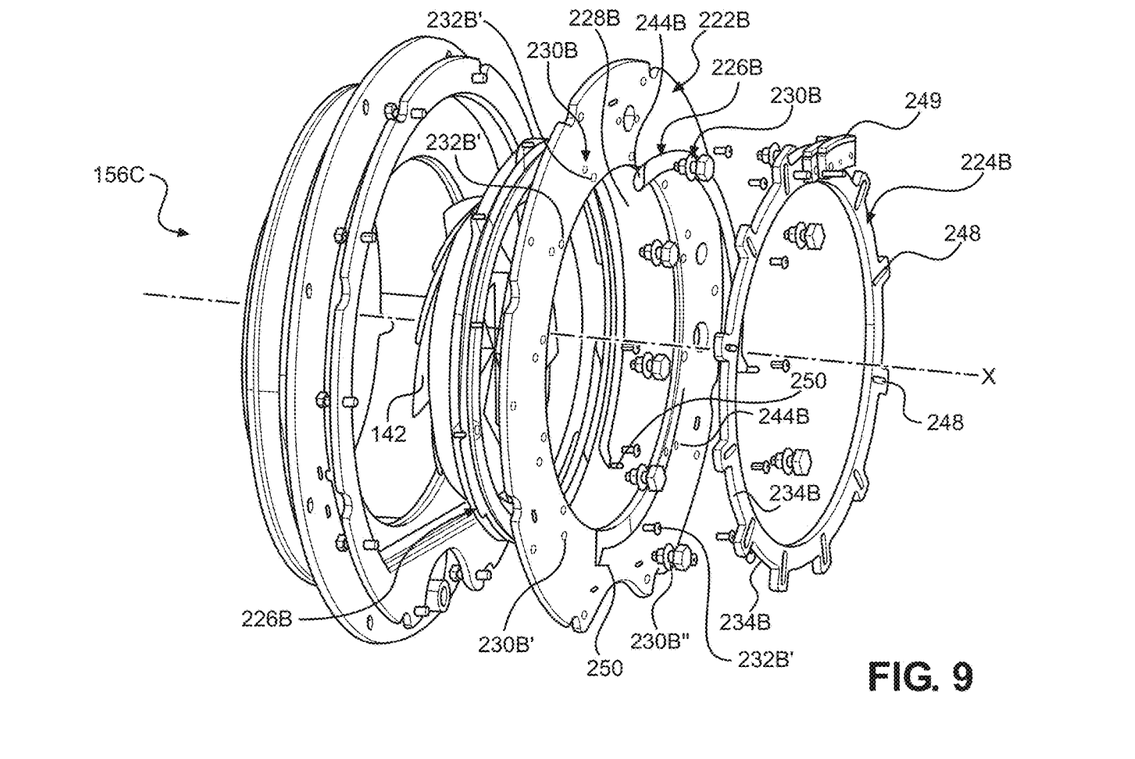
FIG. 9 is an exploded perspective view of the shutter depicted in FIG. 8A.

Finally, turning to FIG. 8A and FIG. 9, a shutter 156C according to other embodiments is shown. The shutter 156C comprises a mounting plate 222B, a mounting ring 224B, and a plurality of blades 226B. The mounting plate 222B is preferably disposed at the blast end 140 (FIG. 2) and forms a portion of the external wall 136 about the diffuser 142. The mounting plate 222B includes a central passage 228B which functionally extends the hollow interior 134 through the mounting plate 222B. In certain embodiments, the mounting plate 222B may be integrated into the rich fuel manifold 108. The mounting plate 222B further includes a plurality of ring guides 230B disposed radially about the central passage 228B and that may, in certain embodiments, comprise shoulder bolts, pins, or other suitable hardware. In the illustrated embodiment, ring guides 230B comprise a hole 230B' formed in the mounting plate 222B and a corresponding shoulder bolt 230B" that is inserted into the hole. Next, the mounting plate 222B further includes a plurality of blade mounts 232B that are also disposed radially about the central passage 228B. The blade mounts 232B may also comprise holes and corresponding pins, screws, shoulder bolts, or other suitable fasteners or securing devices. For example, as shown, each blade mount 232B comprises a hole 232B' and a corresponding screw 232B" that is inserted into the hole.

The outer peripheral surface of mounting ring 224B preferably includes plurality of ring guide contact surfaces 234B. When shutter 156C is assembled, the ring guide contact surfaces 234B contact the ring guides 230B and limit and rotation of the mounting ring 224B relative to mounting plate 222B. The mounting ring 224B further includes a plurality of elongate blade guide paths 248. Blade guide paths 248 in the illustrated embodiment radiate outward from the center of mounting ring 224B. On the other hand, as previously shown in FIG. 7, guide path 246 are oriented in a more tangential direction and do not radiate outwards from the center of the mounting ring 224B. The mounting ring 224B is also configured to rotate about the central passage 228B. For example, if the blast tube 106 and central passage 228B are cylindrical and coaxial, the mounting ring 224B rotates about the shared axis X. The mounting ring 224B preferably includes a rotation means, such as gear teeth 249 that mesh with a corresponding motor and gear (not shown), for rotating the mounting ring about axis X.

The shutter 156C also includes the plurality of blades 226B arranged to define a substantially circular opening 242B. Each blade 226B includes a mounting hole 244B and a blade guide 250. Here, the blade guide 250 comprises a tab extending upstream away from mounting plate 222B. Each blade 226B is rotatably attached to the mounting plate 222B via the mounting hole 244B and the blade mounts 232B, allowing rotation of the blade about the mounting hole. Additionally, the blade guide 250 of each blade 226B is inserted into one of the blade guide paths 248 to control the rotational position of the blades.

Figure 8B:
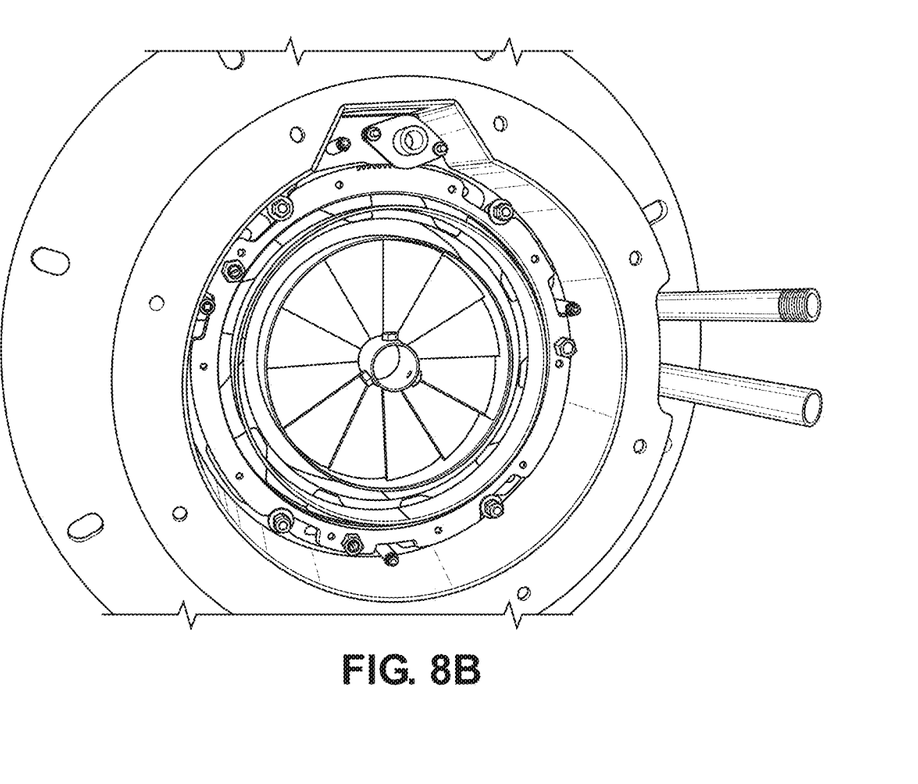
FIG. 8B is a front view of the shutter shown in FIG. 8A, with a plurality of blades shown in an open position.
Figure 8C:
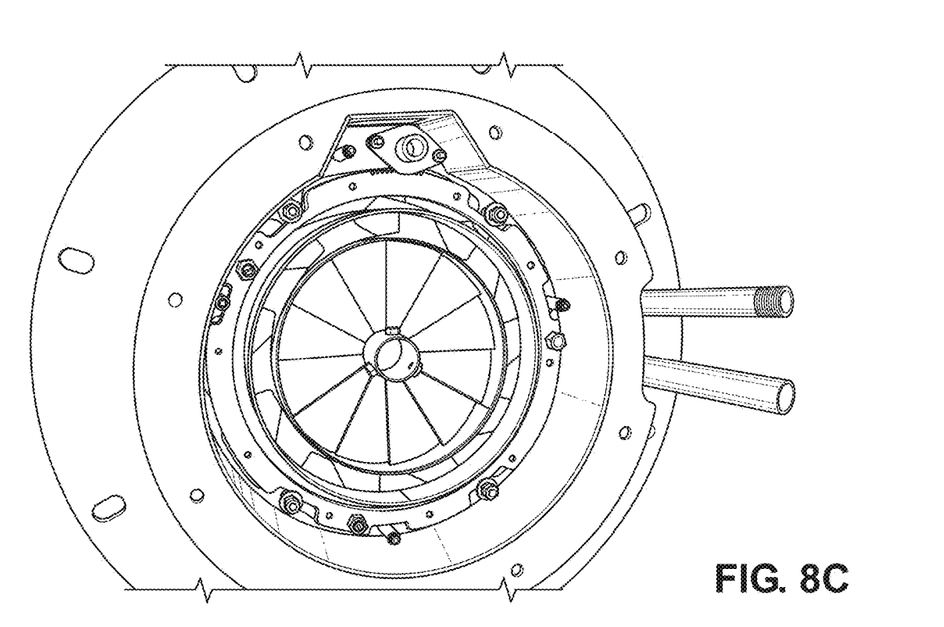
FIG. 8C is a front view of the shutter shown in FIG. 8A, with the plurality of blades shown in a closed position.

When the shutter 156C is assembled, the blades 226B are disposed between the mounting plate 222B and the mounting ring 224B. As the mounting ring 224B rotates relative to the central passage 228B about axis X, the rotation translates to the blades 226B. More specifically, as the mounting ring 224B rotates about axis X, the blade guide paths 248 also move with the mounting ring. The motion of the blade guide paths 248 causes the blades 226B to rotate about the mounting hole 244B, where the degree of rotation is defined by the guide path 248, as the blade guide 250 is located within and is constrained by the guide path. This motion causes the diameter DoB of the substantially circular opening 242B to change from a first diameter to a second diameter. This may also be seen by comparing FIG. 8A, where the shutter is shown in the open position, and FIG. 8B, where the shutter is shown in the closed position. Preferably, the second diameter is the same as the diameter Dd of the diffuser 142 and the blades 226B are at least partially coincident with the diffuser. In other words, at a second diameter, the blades 226B close the auxiliary passage 142B, i.e., the second diameter corresponds to the closed position of the shutter 156C. Although the shutter 156C described here corresponds to a cylindrical blast tube 106 and diffuser 142, the shutter may be adapted to blast tubes and diffusers having different shapes.

Embodiments of the present invention include a method for a burner assembly. The preferred method comprises providing a burner assembly as described above in detail. The preferred method also comprises placing the shutter in the closed position. Then, with the air intake, receiving air from the inlet and moving the air to the outlet. In embodiments including variable dampers, the dampers are placed in an open or partially open position. In certain embodiments where the air intake includes a variable speed blower disposed between the inlet and the outlet, the method further includes activating the blower at an initial speed to provide air flow through the air intake. A next step in the method is, with the premix manifold, receiving the air from the outlet of the air intake. A next step is providing the first fuel from the first fuel source to the fuel inlet of the premix manifold and moving the first fuel into the fuel channel, through the plurality of fuel orifices, and into the internal cavity. Next, the method comprises mixing the first fuel with the air from the outlet to create a premixed air/fuel mixture and providing the premixed air/fuel mixture to the blast tube at the inlet. Next, the premixed air/fuel mixture moves from the inlet of the blast tube to the blast end. The second fuel source then provides the second fuel to the inlet of the rich fuel manifold and the second fuel moves through the front wall of the fuel channel via the plurality of fuel nozzles, creating a distributed second fuel. The second fuel may also be provided contemporaneously with the first fuel. The next step is passing the premixed air/fuel mixture through the diffuser and past the pilot. The pilot then ignites the premixed air/fuel mixture to create a lean center flame. Next, the method comprises passing the distributed second fuel near the lean center flame or past the pilot to ignite the distributed second fuel and create a rich secondary flame. The rich secondary flame and the lean center flame are then combined to create a first flame. Next, the method includes measuring an emissions characteristic of the first flame and, based on the emissions characteristic, adjusting the airflow (via the dampers or blower), adjusting the amount of first fuel, or adjusting the amount of second fuel to create a second flame having a first output level. Preferably the second flame is a low NOx flame.

In certain embodiments, the method may include moving the shutter from the first position to a second position, or a position between the first and second positions. Moving the shutter alters the flow of the premixed air/fuel passing into the blast zone, thereby altering the characteristics of the lean center flame. Based on these altered characteristics, the airflow or amounts of first and second fuel may be adjusted create a third flame having a second and different output level. Preferably the third flame is a low NOx flame.

In certain embodiments, the method includes providing a burner as described herein including a liquid fuel nozzle, as described in detail above. In certain embodiments, the liquid fuel nozzle is disposed within the central node of the diffuser. The method then includes providing a liquid fuel to the liquid fuel passage and the liquid fuel nozzle inlet manifold. The next step is providing the liquid fuel to the liquid fuel diffuser and, in turn, providing a thin film of liquid fuel into the atomizing chamber via the liquid fuel diffuser. Next, atomizing air is provided to the atomizing air inlet via the atomizing air passage. The atomizing air is then provided to the atomizing chamber. A next step is emulsifying the atomizing air and the thin film of liquid fuel within the atomizing chamber to create an atomized air/fuel mixture. A next step is passing the atomized air/fuel mixture through the atomized air/fuel outlet and igniting the mixture with the pilot to create a liquid fuel flame. In certain embodiments, the liquid fuel flame is the only flame present during combustion of the burner. In certain other embodiments, the liquid fuel flame burns along with the lean center flame, the rich secondary flame, or both. The method may include the steps of, after establishing the first flame and the liquid fuel flame, ceasing the flow of the first and second fuels to create a liquid fuel flame only. In certain embodiments, the method includes adjusting the amount of liquid fuel provided to the liquid fuel nozzle based on an emissions characteristic of the different flames, independently or combined into a single flame. As described above, the shutter may be utilized to create flames with desirable emissions characteristics at different output levels.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. A blast tube comprising:
    an external wall creating a hollow interior;
    an inlet end;
    a blast end;
    a diffuser disposed within the hollow interior proximate the blast end and having a primary passage configured to allow fluids to pass through the diffuser;
    an auxiliary passage disposed radially between the diffuser and the external wall; and
    a shutter that is disposed within the hollow interior and is configured to be selectively moved between a plurality of selectable positions, including a first position and a second position,
    wherein, when the shutter is in the first position, the primary passage and auxiliary passage are both open such that a fluid is permitted to flow through both the primary passage and auxiliary passage, and
    wherein, when the shutter is in the second position, the primary passage is open but the auxiliary passage is closed such that the fluid is permitted to flow exclusively through the primary passage.

2. The blast tube of claim 1 wherein the shutter comprises:
    a mounting plate disposed within the hollow interior of the blast tube proximate the blast end, the mounting plate having:
        a central passage;
        a plurality of ring guides disposed radially about the central passage; and
        a plurality of blade mounts disposed radially about the central passage;
    a mounting ring configured to rotate about an axis X relative to the central passage and having:
        a plurality of ring guide contact surfaces that are each configured to contact at least one of the ring guides; and
        a plurality of blade guides;
    a plurality of blades each having an inner edge that, in combination with one another, define an opening that is substantially circular in shape, each blade having a mounting hole and an elongate guide path,
    wherein the mounting hole of each of the plurality of blades engages one of said blade mounts of the mounting plate such that each blade is configured to independently rotate about the mounting hole,
    wherein the elongate guide path of each of the plurality of blades slidably engages a separate blade guide of the plurality blade guides,
    wherein, as the mounting ring rotates about the axis X, rotation of the mounting ring is translated to the plurality of blades via the blade guides thereby causing the blades and each of their respective inner edge to move in unison between a plurality of rotational positions, including a first rotational position and a second rotational position and, thereby, maintaining a substantially circular opening while altering a diameter of the substantially circular opening from a first diameter to a second and different diameter,
    wherein, when the plurality of blades is in the second rotational position, the auxiliary passage is closed by the plurality of blades and fluid is prevented from flowing into the auxiliary passage.

3. The blast tube of claim 2 wherein, the blast tube is cylindrical in shape, wherein:
    the diffuser comprises a circular exterior, concentric with the blast tube, and
    when the shutter is in the closed position, the substantially circular opening is substantially coincident with the circular exterior of the diffuser such that the inner edge of each of the plurality of blades contacts the circular exterior of the diffuser to close the auxiliary passage.

4. The blast tube of claim 1 wherein the shutter comprises an adjustable venturi having:
    a venturi tube disposed within the interior of the blast tube and having an entry cone opening in an upstream direction and an exit cone opening in a downstream direction; and
    a linear motion device attached to the venturi tube and configured to move the venturi tube upstream and downstream within interior of the blast tube between a plurality of selectable positions, including a first selectable position to a second selectable position that corresponds to the closed position, and
    wherein, when the venturi tube is in the second selectable position, the exit cone contacts the diffuser to close the auxiliary passage to prevent fluid from flowing into the auxiliary passage.

5. The blast tube of claim 1 further comprising a flame shaping device disposed at the blast end.

6. A burner including the blast tube of claim 1 comprising:
    an air intake having an inlet and an outlet;
    a windbox configured to alter a flow characteristic of air, the windbox fluidly connected to and disposed downstream of the air intake such that air from the outlet of the air intake flows into the windbox;
    a premix manifold disposed downstream of the windbox and configured to mix fuel and air to form a premixed air/fuel mixture, the premix manifold having:
        an internal cavity created by an inner wall;
        a first fuel channel;
        a plurality of fuel orifices connected to the first fuel channel and disposed radially in the inner wall and configured to allow a first fuel to pass from the first fuel channel into the internal cavity; and a first fuel inlet configured to provide the first fuel to the fuel channel, the blast tube having the inlet end disposed proximate a downstream end of the premix manifold;

a rich fuel manifold disposed radially about the blast end having:

a central void disposed at the blast end, a second fuel channel;

a plurality of fuel nozzles fluidly connected to the second fuel channel and disposed radially about the central void on a front wall and configured to allow a second fuel to pass from the second fuel channel and through the front wall; and a second fuel inlet configured to provide the second fuel to the fuel channel, and a pilot.

7. The burner of claim 6 further comprising a liquid fuel nozzle disposed within the blast tube and configured to deliver an atomized air/fuel mixture to the blast end, the liquid fuel nozzle having:

a liquid fuel passage configured to provide a liquid fuel;

a fuel nozzle head fluidly connected to the liquid fuel passage and configured to atomize liquid fuel, the fuel nozzle head having:

an atomizing chamber;

a liquid fuel nozzle inlet manifold located in the atomizing chamber and fluidly connected to the liquid fuel passage;

a liquid fuel diffuser located in the atomizing chamber and fluidly connected to the liquid fuel nozzle inlet manifold, the liquid fuel diffuser configured to provide a liquid fuel into the atomizing chamber;

an atomizing air passage for providing atomized air to the atomizing chamber of the fuel nozzle head, the atomizing air passage including an atomizing air nozzle inlet and an atomized air/fuel outlet;

wherein, as the atomizing air enters the atomizing chamber via the atomizing air passage, the liquid fuel is emulsified with the atomizing air to create the atomized air/fuel mixture, and wherein the atomized air/fuel mixture exits the atomizing chamber through the atomized air/fuel outlet.

8. The burner of claim 6 wherein the air intake further includes a damper having a plurality of adjustable damper blades disposed at the inlet, each adjustable damper blade being infinitely adjustable between a first position and second position to move the damper between a plurality of selectable positions, including a selectable open position and a selectable closed position, and wherein airflow through gaps between adjacent pairs of the plurality of adjustable damper blades varies based on the position of the plurality of adjustable dampers.

9. The burner of claim 8 further comprising a variable speed blower that is configured to pull air through the inlet and push the air out of the outlet.

10. The burner of claim 6 wherein the shutter comprises:

a mounting plate disposed within the hollow interior of the blast tube proximate the blast end, the mounting plate having:

a central passage;

a plurality of ring guides disposed radially about the central passage; and a plurality of blade mounts disposed radially about the central passage;

a mounting ring configured to rotate about an axis X relative to the central passage and having:

a plurality of ring guide contact surfaces that are each configured to contact at least one of the ring guides; and a plurality of blade guides;

a plurality of blades each having an inner edge that, in combination with one another, define an opening that is substantially circular in shape, each blade having a mounting hole and an elongate guide path, wherein the mounting hole of each of the plurality of blades engages one of said blade mounts of the mounting plate such that each blade is configured to independently rotate about the mounting hole, wherein the elongate guide path of each of the plurality of blades slidably engages a separate blade guide of the plurality blade guides, wherein, as the mounting ring rotates about the axis X, rotational motion of the mounting ring is translated to the plurality of blades via the blade guides thereby causing the blades and each of their respective inner edge to move in unison between a plurality of rotational positions, including a first rotational position and a second rotational position and, thereby, maintaining a substantially circular opening while altering a diameter of the substantially circular opening from a first diameter to a second and different diameter, wherein, when the plurality of blades is in the second rotational position, the auxiliary passage is closed by the plurality of blades and fluid is prevented from flowing into the auxiliary passage.

11. The burner of claim 6 wherein the shutter comprises an adjustable venturi having:

a venturi tube disposed within the interior of the blast tube and having an entry cone opening in an upstream direction and an exit cone opening in a downstream direction; and a linear motion device attached to the venturi tube and configured to move the venturi tube upstream and downstream within interior of the blast tube between a plurality of selectable positions, including a first selectable position to a second selectable position that corresponds to the closed position, and wherein, when the venturi tube is in the second selectable position, the exit cone contacts the diffuser to close the auxiliary passage to prevent fluid from flowing into the auxiliary passage.

12. The burner of claim 6 wherein the diffuser comprises:

a central node;

a plurality of diffuser blades disposed radially about the central node, each diffuser blade having a first end attached to the central node; and an outer band concentric to the central node and fixed in position relative to the central node, wherein a fluid passing through the diffuser passes through and is swirled by the plurality of blades.

13. A method of operating a burner to produce a low NOx flame, the method comprising:

providing a burner comprising:

an air intake having an inlet and an outlet;

a windbox configured to alter a flow characteristic of air, the windbox fluidly connected to and disposed downstream of the air intake such that air from the outlet of the air intake flows into the windbox;

a premix manifold disposed downstream of the windbox and configured to mix fuel and air to form a premixed air/fuel mixture, the premix manifold having:

an internal cavity created by an inner wall;

a first fuel channel;
a plurality of fuel orifices connected to the first fuel channel and disposed radially in the inner wall and configured to allow a first fuel to pass from the first fuel channel into the internal cavity; and
a first fuel inlet configured to provide the first fuel to the first fuel channel,
a blast tube having the inlet end disposed proximate a downstream end of the premix manifold, the blast tube having:
an external wall creating a hollow interior;
an inlet end;
a blast end;
a diffuser disposed within the hollow interior proximate the blast end and having a primary passage configured to allow fluids to pass through the diffuser;
an auxiliary passage disposed radially between the diffuser and the external wall; and
a shutter that is disposed within the hollow interior and is configured to be selectively moved between a plurality of selectable positions, including a first position and a second position;
a rich fuel manifold disposed radially about the blast end having:
a central void disposed at the blast end,
a second fuel channel;
a plurality of fuel nozzles fluidly connected to the second fuel channel and disposed radially about the central void on a front wall and configured to allow a second fuel to pass from the second fuel channel and through the front wall; and
a second fuel inlet configured to provide the second fuel to the second fuel channel, and
a pilot;
passing air into the windbox via the air intake;
receiving the air from the windbox with the premix manifold;
providing the first fuel to the fuel channel of the premix manifold and then moving the first fuel through the plurality of fuel orifices and into the internal cavity;
in the premix manifold, mixing the first fuel with the air to create a premixed air/fuel mixture;
providing the premixed air/fuel mixture to the blast tube;
with the pilot, igniting the premixed air/fuel mixture at the blast end to create a lean center flame,
providing the second fuel to the rich fuel manifold and then moving the second fuel through the front wall of the second fuel channel via the plurality of fuel nozzles to create a distributed second fuel;
igniting the distributed second fuel using the lean center flame or the pilot to create a rich secondary flame;
mixing the rich secondary flame with the lean center flame to create a first flame; and
adjusting an amount of first fuel provided or adjusting an amount of the second fuel provided to create a low NOx second flame.

14. The method of claim 13 wherein the burner further includes a variable speed blower that is configured to pull air through the inlet and push the air out of the outlet and a plurality of adjustable dampers disposed at the inlet of the air intake, each adjustable damper blade being infinitely adjustable between a first position and second position to move the damper between a plurality of selectable positions, including a selectable open position and a selectable closed position, and wherein airflow through gaps between adjacent pairs of the plurality of adjustable damper blades varies based on the position of the plurality of adjustable dampers, the method further includes the steps of:
activating the blower at an initial speed to provide air flow through the air intake and into the premix manifold; and
providing a third flame having a flame characteristic that differs from the first flame and the second flame by changing the position of the dampers or by changing the speed of the blower.

15. The method of claim 13 wherein the premixed air/fuel mixture that is ignited by the pilot passes out of the blast tube via the primary passage of the diffuser but not the auxiliary passage.

16. The method of claim 13 wherein the premixed air/fuel mixture that is ignited by the pilot passes out of the blast tube via the primary passage of the diffuser and via the auxiliary passage.

17. The method of claim 15 wherein the burner further comprising:
a liquid fuel nozzle disposed within the blast tube and configured to deliver an atomized air/fuel mixture to the blast end, the liquid fuel nozzle having:
a liquid fuel passage configured to provide the liquid fuel;
a fuel nozzle head fluidly connected to the liquid fuel passage and configured to atomize liquid fuel, the fuel nozzle head having:
an atomizing chamber;
a liquid fuel nozzle inlet manifold located in the atomizing chamber and fluidly connected to the liquid fuel passage;
a liquid fuel diffuser located in the atomizing chamber and fluidly connected to the liquid fuel nozzle inlet manifold, the liquid fuel diffuser configured to provide a liquid fuel into the atomizing chamber;
an atomizing air passage for providing atomized air to the atomizing chamber of the fuel nozzle head, the atomizing air passage including an atomizing air nozzle inlet and an atomized air/fuel outlet;
the method further comprising:
providing a liquid fuel to the liquid fuel nozzle inlet manifold via the liquid fuel passage;
depositing the liquid fuel on a surface of the liquid fuel diffuser within the atomizing chamber;
providing atomized air to the atomizing chamber and emulsifying the atomizing air and the liquid fuel to create an atomized air/fuel mixture;
passing the atomized air/fuel mixture through the atomized air/fuel outlet; and
igniting the atomized air/fuel mixture to create a liquid fuel flame.

18. The method of claim 17 further comprising combining the lean center flame, the rich secondary flame, and the liquid fuel flame to create a third flame.

19. The method of claim 18 further comprising, based on a flame characteristic of the first flame, second flame, or third flame, modifying the liquid fuel provided to the liquid fuel nozzle inlet manifold from a first amount to a second amount or modifying the atomizing air from a first amount to a second amount to create an altered flame.

20. The method of claim 13 wherein the first fuel and the second fuel are gaseous fuels, the method further comprising changing over from providing the first fuel and second fuel to providing only the liquid fuel.

* * * * *